US011079003B2

(12) United States Patent
Gotz et al.

(10) Patent No.: US 11,079,003 B2
(45) Date of Patent: Aug. 3, 2021

(54) BELT PULLEY DECOUPLER

(71) Applicant: Schaeffler Technologies AG & Co. KG, Herzogenaurach (DE)

(72) Inventors: Andreas Gotz, Wilhelmsdorf (DE); Eugen Bauer, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 356 days.

(21) Appl. No.: 16/305,578

(22) PCT Filed: Jun. 27, 2017

(86) PCT No.: PCT/DE2017/100537
§ 371 (c)(1),
(2) Date: Nov. 29, 2018

(87) PCT Pub. No.: WO2018/001414
PCT Pub. Date: Jan. 4, 2018

(65) Prior Publication Data
US 2020/0332876 A1  Oct. 22, 2020

(30) Foreign Application Priority Data
Jun. 28, 2016 (DE) .......................... 102016211558.8

(51) Int. Cl.
*F16H 55/36* (2006.01)
*F16D 41/20* (2006.01)
*F02B 67/06* (2006.01)

(52) U.S. Cl.
CPC .......... *F16H 55/36* (2013.01); *F16D 41/206* (2013.01); *F02B 67/06* (2013.01); *F16H 2055/363* (2013.01)

(58) Field of Classification Search
CPC .. F16H 55/36; F16H 2055/366; F16D 41/206; F16D 13/76; F02B 67/06
(Continued)

(56) References Cited

U.S. PATENT DOCUMENTS 5,598,913 A * 2/1997 Monahan ............... F16D 41/206
192/41 S
6,394,247 B1 * 5/2002 Monahan ............... F16D 41/206
192/41 S
(Continued)

FOREIGN PATENT DOCUMENTS

CN 101936378 1/2011
CN 204004300 12/2014
(Continued)

*Primary Examiner* — Henry Y Liu
(74) *Attorney, Agent, or Firm* — Volpe Koenig

(57) ABSTRACT

A belt pulley decoupler for transmitting drive torque from the belt of an auxiliary unit belt drive to the shaft of one of the auxiliary units is provided, including: a belt pulley, a hub to be mounted on the shaft, a first sleeve, which is rotationally fixed in the pulley, a second sleeve, which is rotatable in the pulley, and a series circuit of a decoupler spring and a disposed in the drive torque flow between the belt pulley and the hub. The wrap-around band ends, which couple the two sleeves to one another non-rotatably while transmitting the drive torque, extend the wrap-around band radially. One of the two sleeves has a circumferentially extending slot and the wrap-around band end coupled to this sleeve is configured as a leg, which interlockingly engages in the slot non-rotatably in a direction of rotation of the drive torque.

16 Claims, 9 Drawing Sheets

(58) Field of Classification Search
USPC .......................................................... 474/70
See application file for complete search history.

(56) References Cited

U.S. PATENT DOCUMENTS

| | | | | |
|---|---|---|---|---|
| 7,153,227 B2* | 12/2006 | Dell | ........................ | F16H 55/36 |
| | | | | 474/70 |
| 7,591,357 B2* | 9/2009 | Antchak | ............... | F16D 41/206 |
| | | | | 192/41 S |
| 7,618,337 B2* | 11/2009 | Jansen | ...................... | F16D 3/72 |
| | | | | 474/74 |
| 7,975,821 B2* | 7/2011 | Antchak | ............... | F16D 41/206 |
| | | | | 192/55.1 |
| RE47,143 E * | 11/2018 | Mevissen | ................. | F16D 13/12 |
| 2005/0250607 A1* | 11/2005 | Jansen | ...................... | F16D 3/72 |
| | | | | 474/74 |
| 2007/0240964 A1* | 10/2007 | Saito | .................... | F16D 41/206 |
| | | | | 192/41 S |
| 2008/0194339 A1* | 8/2008 | Antchak | ............... | F16D 41/206 |
| | | | | 464/40 |
| 2012/0298474 A1* | 11/2012 | Ward | ...................... | F16H 55/36 |
| | | | | 192/41 S |
| 2013/0037370 A1* | 2/2013 | Marion | ................. | F16D 41/206 |
| | | | | 192/55.5 |
| 2013/0087428 A1* | 4/2013 | Antchak | ............... | F16F 15/123 |
| | | | | 192/41 S |
| 2013/0217524 A1* | 8/2013 | Antchak | .................. | F16D 3/14 |
| | | | | 474/94 |
| 2014/0008175 A1* | 1/2014 | Schneider | ............... | F16H 55/36 |
| | | | | 192/41 S |
| 2014/0238809 A1* | 8/2014 | Boyes | ..................... | F16D 13/12 |
| | | | | 192/75 |
| 2014/0305765 A1* | 10/2014 | Serkh | ...................... | F16H 55/36 |
| | | | | 192/41 S |
| 2014/0329631 A1* | 11/2014 | Mevissen | ................ | F16H 55/36 |
| | | | | 474/166 |
| 2015/0027844 A1* | 1/2015 | Serkh | ...................... | F16D 13/76 |
| | | | | 192/75 |
| 2015/0075943 A1* | 3/2015 | Williams | .................. | F16D 3/12 |
| | | | | 192/41 S |
| 2015/0167816 A1* | 6/2015 | Li | ........................... | F16H 55/36 |
| | | | | 474/166 |
| 2015/0308556 A1* | 10/2015 | Liu | ........................ | F02B 67/06 |
| | | | | 474/94 |
| 2015/0345575 A1* | 12/2015 | Antchak | ................ | F16D 43/24 |
| | | | | 474/94 |
| 2016/0138700 A1* | 5/2016 | Hauck | .................... | F16H 55/36 |
| | | | | 474/94 |
| 2016/0223050 A1* | 8/2016 | Williams | ............ | F16F 15/1203 |
| 2018/0023638 A1* | 1/2018 | Kastner | .................... | F16D 3/12 |
| | | | | 192/41 R |
| 2018/0031057 A1* | 2/2018 | Kastner | ................ | F16D 41/206 |
| 2018/0106355 A1* | 4/2018 | Canto Michelotti | ..... | F16D 3/12 |
| 2018/0328414 A1* | 11/2018 | Kastner | .................. | F16D 7/022 |

FOREIGN PATENT DOCUMENTS

| | | |
|---|---|---|
| DE | 202015001002 | 5/2015 |
| DE | 102015202531 | 12/2015 |
| EP | 2894364 | 7/2015 |

* cited by examiner

BELT PULLEY DECOUPLER

SUMMARY

The invention relates to a belt pulley decoupler for transmitting the drive torque from the belt of an auxiliary unit belt drive to the shaft of one of the auxiliary units, comprising:
a belt pulley,
a hub to be mounted on the shaft,
a first sleeve locked in rotation in the belt pulley,
a second sleeve that can rotate in the belt pulley,
and a series circuit that is arranged in the flow of drive torque between the belt pulley and the hub and is made from a decoupler spring and a wrap-around band that extends in the direction of the rotational axis of the belt pulley decoupler and is arranged radially between the sleeves and the decoupler spring.

Here, the wrap-around band ends widen the wrap-around band radially, which couples (in the widened state) the two sleeves with each other in a rotationally locked manner while transmitting the drive torque.

Rotational oscillations and irregularities that are introduced by the crankshaft of an internal combustion engine into its auxiliary unit belt drive can be compensated, by known means, by belt pulley decouplers that are typically constructed as generator belt pulleys and are usually called decouplers or isolators. The wrap-around band is used as a one-way coupling that transmits the drive torque, in the closed state, from the belt pulley to the hub, wherein the elasticity of the decoupler spring connected in series to the wrap-around band smoothens the rotational irregularities originating from the belt drive. For the case of delayed rotating belt pulleys, the wrap-around band opens, wherein—in the reverse direction—significant torque cannot be transmitted from the hub to the belt pulley, so that the lagging generator shaft can overrun the belt pulley.

A belt pulley decoupler of the type named above with two sleeves arranged in the belt pulley and receiving the wrap-around band is known from DE 10 2015 202 531 B3.

Starting from this arrangement, the present invention is based on the objective of providing such a belt pulley decoupler in a significantly more compact construction.

The solution is given here through one or more features of the invention. Accordingly, one of the two sleeves should have a circumferentially extending slot and the wrap-around band end coupled with this sleeve should be constructed as a leg that engages in the slot in a rotationally locked manner with a positive-locking connection in the direction of rotation of the drive torque.

The rotationally locked engagement with a positive-locking connection of one of the wrap-around band ends in one of the sleeves can replace the typical friction contact surface that has previously been required for the non-positive-locking connection for transmitting torque between this sleeve and the wrap-around band end. In this way, the sleeve section, in which the wrap-around band end engages in a rotationally locked manner, can have a very short construction. Thus, the entire belt pulley decoupler can have an axially very compact construction, if the structural length of the sleeve is decisive for the structural length of the decoupler.

In a first embodiment, the leg should engage in the slot in a self-locking connection against the direction of rotation of the drive torque. Consequently, the drag torque of the wrap-around band that tries to drive the belt pulley in the overrunning operation of the belt pulley decoupler is transmitted only by the friction contact between the slot and the leg jammed therein in a self-locking connection.

In an alternative second embodiment, the leg should engage in the slot in a positive-locking connection against the direction of rotation of the drive torque. In this case, the torque transmission between the slot and the leg form a positive-locking connection both in the direction of rotation and also in the direction opposite the direction of rotation.

Preferably, the leg is coupled in a rotationally locked manner with the first sleeve, i.e., with the sleeve locked in rotation in the belt pulley.

The radial bearing of the second sleeve, i.e., which can rotate in the belt pulley, can be realized in various ways:
the second sleeve is supported only in the belt pulley
the second sleeve is supported only in the first sleeve
the second sleeve is supported both in the first sleeve and also in the belt pulley.

In this construction, it is preferred that the second sleeve is supported in a sliding bearing sleeve that is supported radially against the belt pulley and axially against a roller bearing that supports the belt pulley on the hub. The sliding bearing sleeve preferably is formed of polyamide and is pressed into the belt pulley with a slight overdimension, so that the second sleeve rotates in the sliding bearing sleeve. In the typical case that the roller bearing is a grooved ball bearing, the axial support of the sliding bearing sleeve should be realized such that the sliding bearing sleeve contacts axially against the outer ring of the grooved ball bearing. If the sliding bearing sleeve is fixed in the belt pulley in a rotationally fixed manner, then there is also no relative rotation with respect to the bearing outer ring causing friction.

BRIEF DESCRIPTION OF THE DRAWINGS

Additional features of the invention are given from the following description and from the drawings, in which are shown four embodiments of belt pulley decouplers according to the invention for the generator arranged in the auxiliary unit belt drive of an internal combustion engine. If not specified otherwise, identical or functionally identical features or components are provided with identical reference symbols. Shown are.

DETAILED DESCRIPTION

Figure 1:
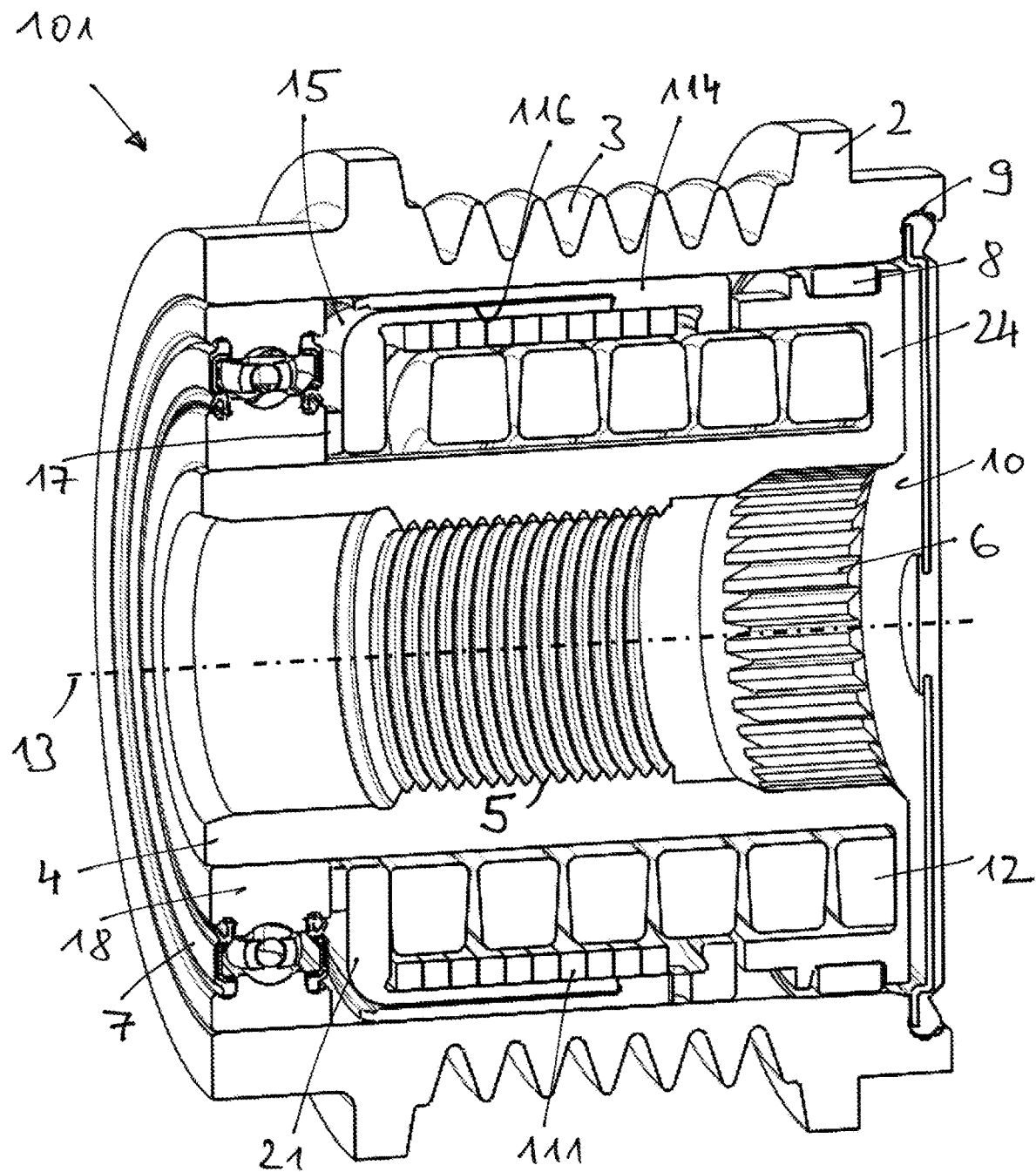
FIG. 1 the first belt pulley decoupler in perspective longitudinal section,
FIG. 2 the first belt pulley decoupler in exploded view,
FIG. 3 the first sleeve of the first belt pulley decoupler in enlarged view,
FIG. 4 the first sleeve according to FIG. 3 in a view with dimensions,
FIG. 5 the first sleeve according to FIG. 3 in a view with dimensions,
FIG. 6 the second belt pulley decoupler in perspective longitudinal section,
FIG. 7 the second belt pulley decoupled in exploded view,
FIG. 8 the first sleeve of the second belt pulley decoupler in enlarged view,
FIG. 9 the third belt pulley decoupler in perspective longitudinal section,
FIG. 10 the third belt pulley decoupler in exploded view,
FIG. 11 the first sleeve of the third belt pulley decoupler in enlarged view,
FIG. 12 the fourth belt pulley decoupler in perspective longitudinal section,
FIG. 13 the fourth belt pulley decoupler in exploded view, and FIG. 14 the first sleeve of the fourth belt pulley decoupler in enlarged view.
Figure 2:
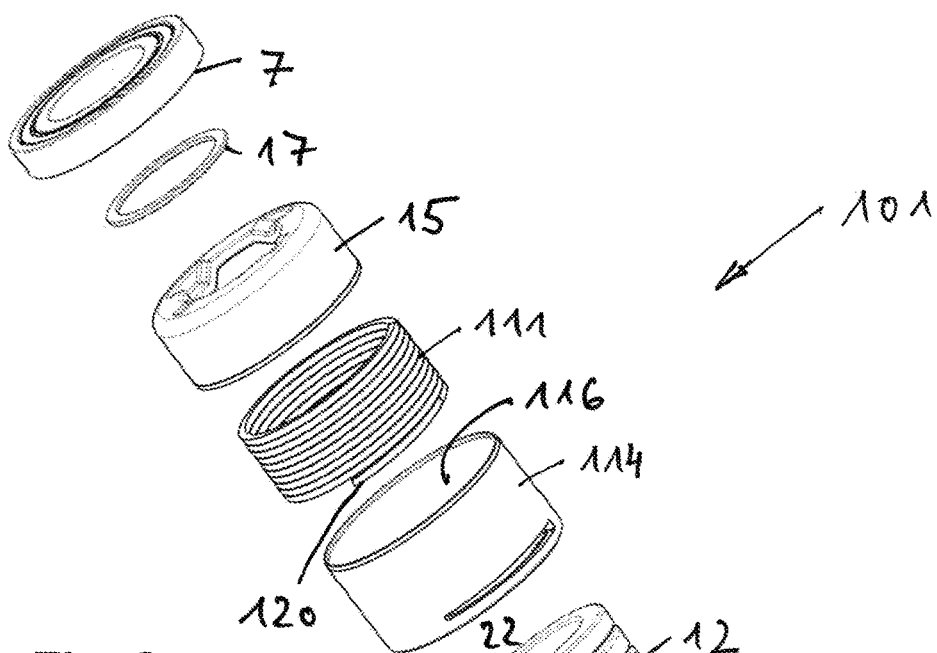

FIGS. 1 and 2 show the first embodiment of a belt pulley decoupler 101 according to the invention in a longitudinal section and exploded view, respectively. A hollow cylindrical belt pulley 2, whose outer lateral surface 3 encircled by the belt is profiled according to the poly-V shape of the belt, is driven by the belt in the direction of rotation indicated in FIG. 2 on the belt pulley 2. The belt pulley 2 is supported so that it can rotate on a hub 4 that is screwed rigidly to the generator shaft. In this way, the hub 4 has an internal thread 5 and internal serrations 6 as an engagement contour for the assembly tools for nuts and bolts on the front end section at a distance from the generator. The support of the belt pulley 2 on the hub 4 is realized on the generator-side end radially and axially by a roller bearing 7 and on the end at a distance from the generator radially by a sliding bearing 8. The roller bearing 7 is a single-row grooved ball bearing sealed on both sides and the sliding bearing 8 is a radial bearing ring made from polyamide slotted for its assembly on the hub 4. In the entire region between the sliding bearing 8 and the roller bearing 7, the inner lateral surface of the belt pulley 2 has a constant inner diameter, so that this region is accessible for especially simple and economical turning work. The belt pulley 4 has an extension 9 that is stepped in its diameter only on the end at a distance from the generator and in which a protective cap 10 is snapped after the assembly of the belt pulley decoupler 101 on the generator.

The components that are essential for the functioning of the belt pulley decoupler 101 are a one-way coupling constructed as a wrap-around band 111 and a decoupler spring 12 connected in series with the wrap-around band 111—with respect to the flow of drive torque from the belt pulley 2 to the hub 4—in the form of a helical torsion spring. The decoupler spring 12 and the wrap-around band 111 extend in the direction and presently coaxial to the rotational axis 13 of the belt pulley decoupler 101, wherein the wrap-around band 111 runs in the radial annular space between the belt pulley 2 and the decoupler spring 12.

The wrap-around band 111 is right-hand wound with rectangular wire cross section and is enclosed on its outer lateral surface by two sleeves 114 and 15. The first sleeve 114 is pressed into the inner lateral surface of the belt pulley 2 in a rotationally locked manner and has an inner lateral surface 116 that is stepped in diameter and supports the second sleeve 15 so that it can rotate in the area of the expanded inner diameter. It can be clearly seen that the length of the inner lateral surface 116 is significantly smaller in the non-expanded inner diameter region than the inner diameter region of the second sleeve 15 surrounding the wrap-around band 111. The different in length between these two inner diameter regions corresponds approximately to the axial dimension, by which the belt pulley decoupler 101 is shortened with respect to a known decoupler.

The second sleeve 15 contacts, in the axial direction, a sliding bearing ring 17 that supports the axial pretensioning force of the decoupler spring 12 on the inner ring 18 of the roller bearing 7.

Figure 4:
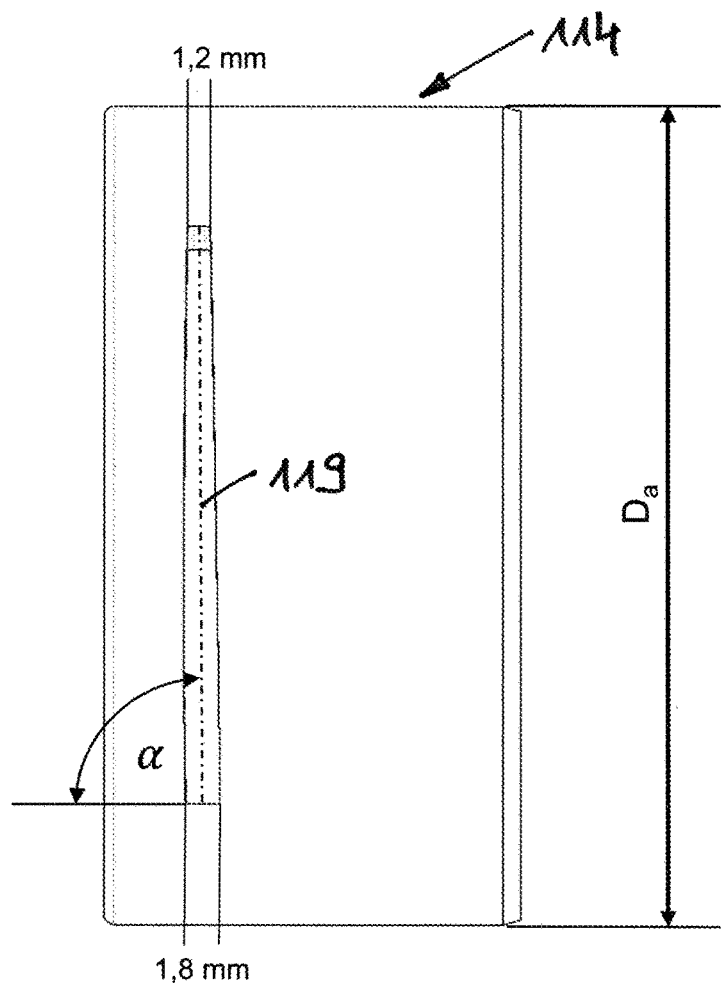
Figure 5:
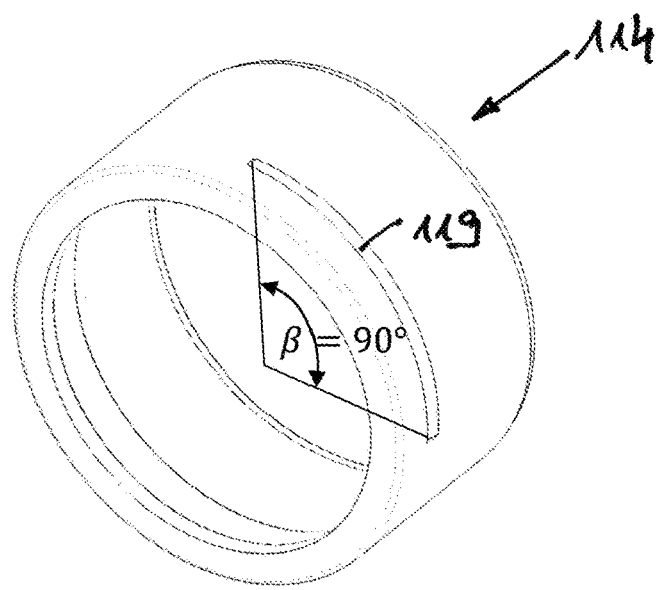

The two sleeves 114, 15 are produced as sheet-metal molded parts and dimensioned so that they enclose the wrap-around band 111 with a constant-size inner diameter. As becomes clear in connection with FIGS. 3 to 5, the first sleeve 114 is provided with a circumferentially extending slot 119. The wrap-around band end running in the flow of drive torque on the side of the belt pulley 2 and coupled with the first sleeve 114 is constructed as a leg 120 that projects radially outward with respect to the otherwise constant-diameter wound body of the wrap-around band 111 and engages in the slot 119 in a rotationally locked manner. The wrap-around band end running in the flow of drive torque on the side of the hub 4 and coupled with the second sleeve 15 is, in contrast, without a leg and the wrap-around band 111 expands merely due to the friction contact with the second sleeve.

Figure 3:
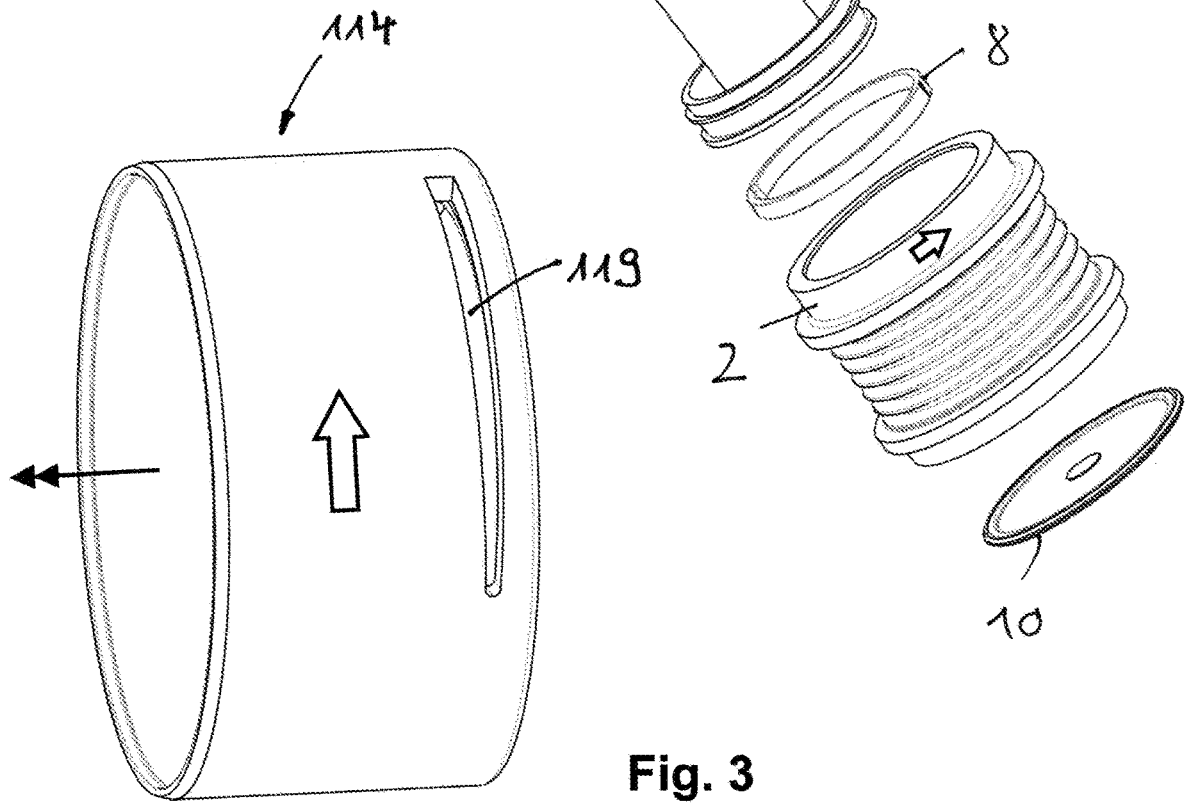

The rotationally locked engagement of the leg 120 is realized in the first belt pulley decoupler 101 by a positive-locking connection in the direction of rotation of the drive torque and by the self-locking in the direction opposite this direction of rotation that is indicated in FIG. 3 by the axis-parallel double arrow. The wrap-around band 111 and the slot 119 are here dimensioned in the following way: The width of the wrap-around band rectangular cross section identical to the spring pitch of the wrap-around band 111 equals 1.6 mm and the slot 119 extending circumferentially about approximately 90° expands in the driving direction of rotation from 1.2 mm to 1.8 mm. The slope angle adapted to the spring pitch of the wrap-around band 111 equals α=89.3°, based on the following formula:

$$\alpha = 90° - \tan^{-1}\frac{\text{Spring Pitch}}{\pi \times D_a}$$

Where $D_a$=42.2 mm outer diameter of the first sleeve 114.

For a surface roughness of Rz10 of the slot 119, the leg 120 is jammed in a self-locking manner in the slot 119. The drive torque rotating in the double arrow direction is transmitted in a positive-locking connection from the narrower end section of the slot 119 to the leg 120 of the wrap-around band 111. In the overrunning operation of the belt pulley decoupler 101, in reverse, the drag torque of the wrap-around band 111 acting against this direction of rotation is supported by the self-locking in the leg-slot contact, so that the wrap-around band end coupling with the second sleeve 15 only by static friction slips into the second sleeve 15 (while generating the drag torque).

The flow of drive torque from the driving belt to the generator shaft is realized via the rotationally locked coupling of the sleeves 114 and 15 with each other and specially via belt pulley 2—first sleeve 114—positive-locking connection between slot 119/leg 120—radially widened wrap-around band 111—static friction between wrap-around band 111/second sleeve 15—(not shown) step on the spring plate 21 of the second sleeve 15—circumferential end face 22 of the decoupler spring 12—radially widened decoupler spring 12—circumferential end face 23 of the decoupler spring 12—(not shown) step on the spring plate 24 of hub 4—hub 4.

The reverse flow of drive torque from the overrunning generator shaft to the belt is realized via hub 4—(not shown) projection on the spring plate 24 of hub 4—recess 25 of the decoupler spring 12—radially compressed decoupler spring 12—recess 26 of the decoupler spring 12—(not shown) projection on the spring plate 21 of the second sleeve 15—sliding friction between second sleeve 15/wrap-around band 111—wrap-around band 111—self-locking static friction between leg 120/slot 119—first sleeve 114—belt pulley 2.

The previously mentioned (not shown) projections of the spring plates 21, 24 engage axially in the end-side recesses 26 and 25, respectively, of the decoupler spring 12, in order to prevent, in the overrunning operation of the belt pulley decoupler 101, speeding-up of the spring ends on the spring plates 21, 24 caused by the sliding friction of the wrap-around band 111 then slipping in the second sleeve 15. Such an anti-ramp-up mechanism is known from DE 20 2015 001 002 U1 and prevents the end faces 22, 23 of the decoupler spring 12 from moving away from the (not shown) steps of the axially ramp-shaped rising spring plates 21, 24, running up the ramps, and cyclically falling down to the previously mentioned (not shown) steps of the spring plates 21, 24.

Figure 6:
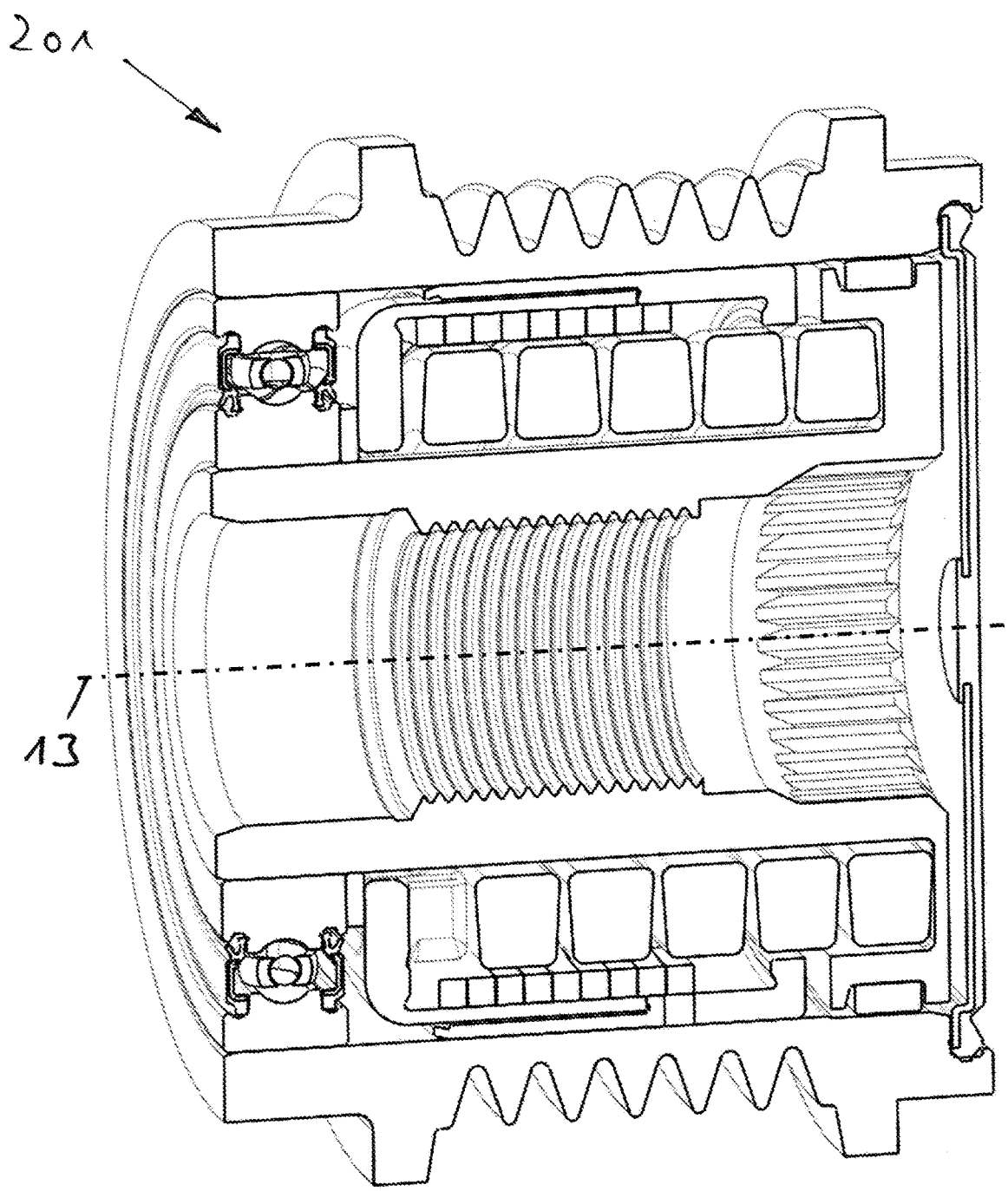
Figure 7:
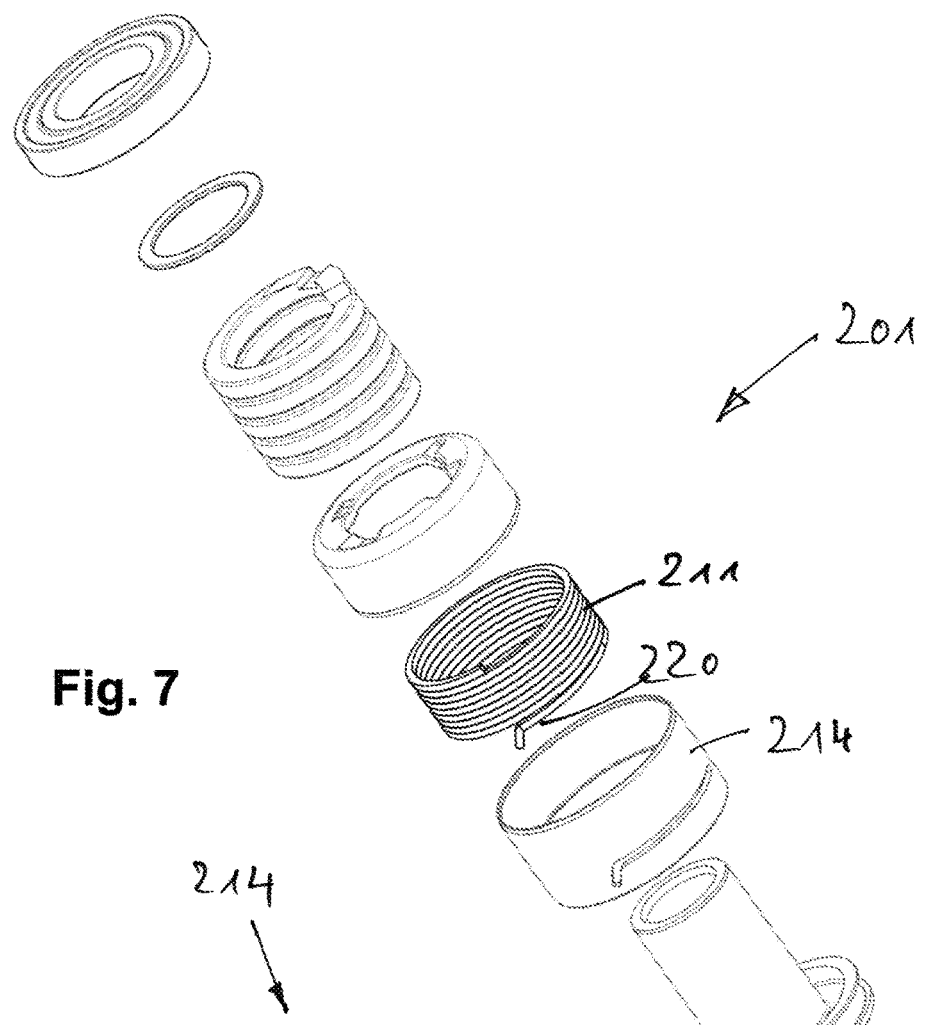
Figure 8:
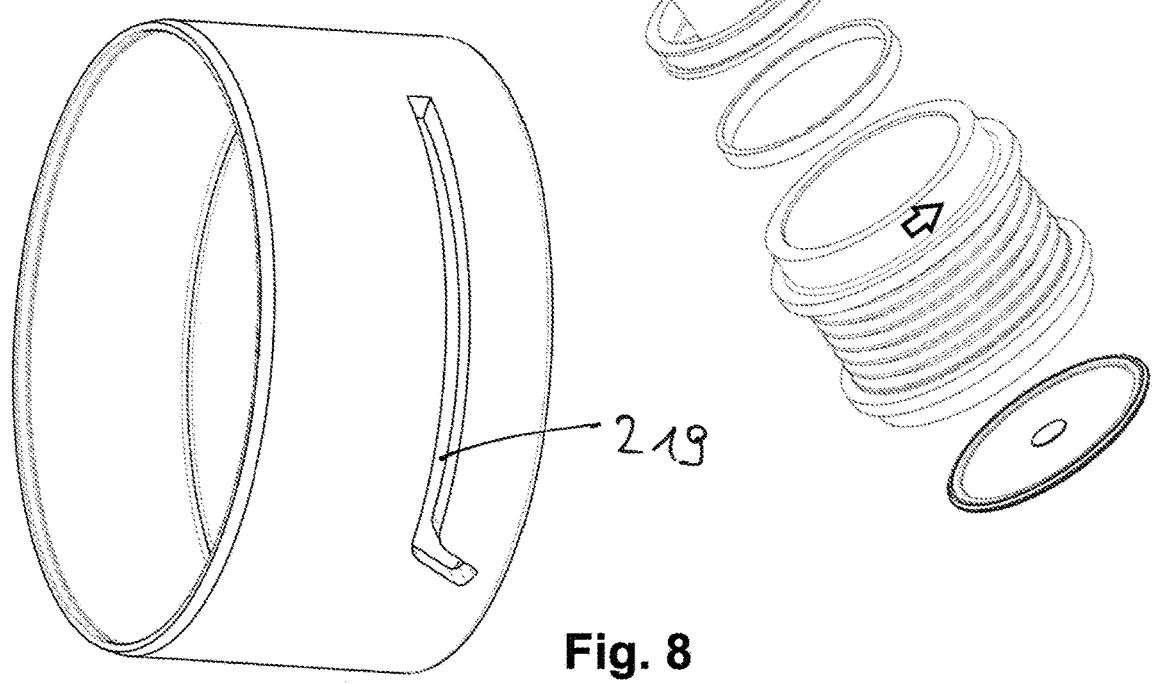

FIGS. 6 and 7 show the second embodiment of a belt pulley decoupler 201 according to the invention in longitudinal section and exploded view, respectively. The belt pulley decoupler 201 differs from the previously explained first embodiment by the rotationally locked engagement of the wrap-around band 211. In this case, the leg 220 engages both in and also opposite the direction of rotation of the drive torque (see FIG. 3) with a positive-locking connection in the slot 219 of the first sleeve 214 that is shown enlarged in FIG. 8. This is realized such that the leg 220 and the slot 219 are each angled in a hook shape toward the rotational axis 13.

Figure 9:
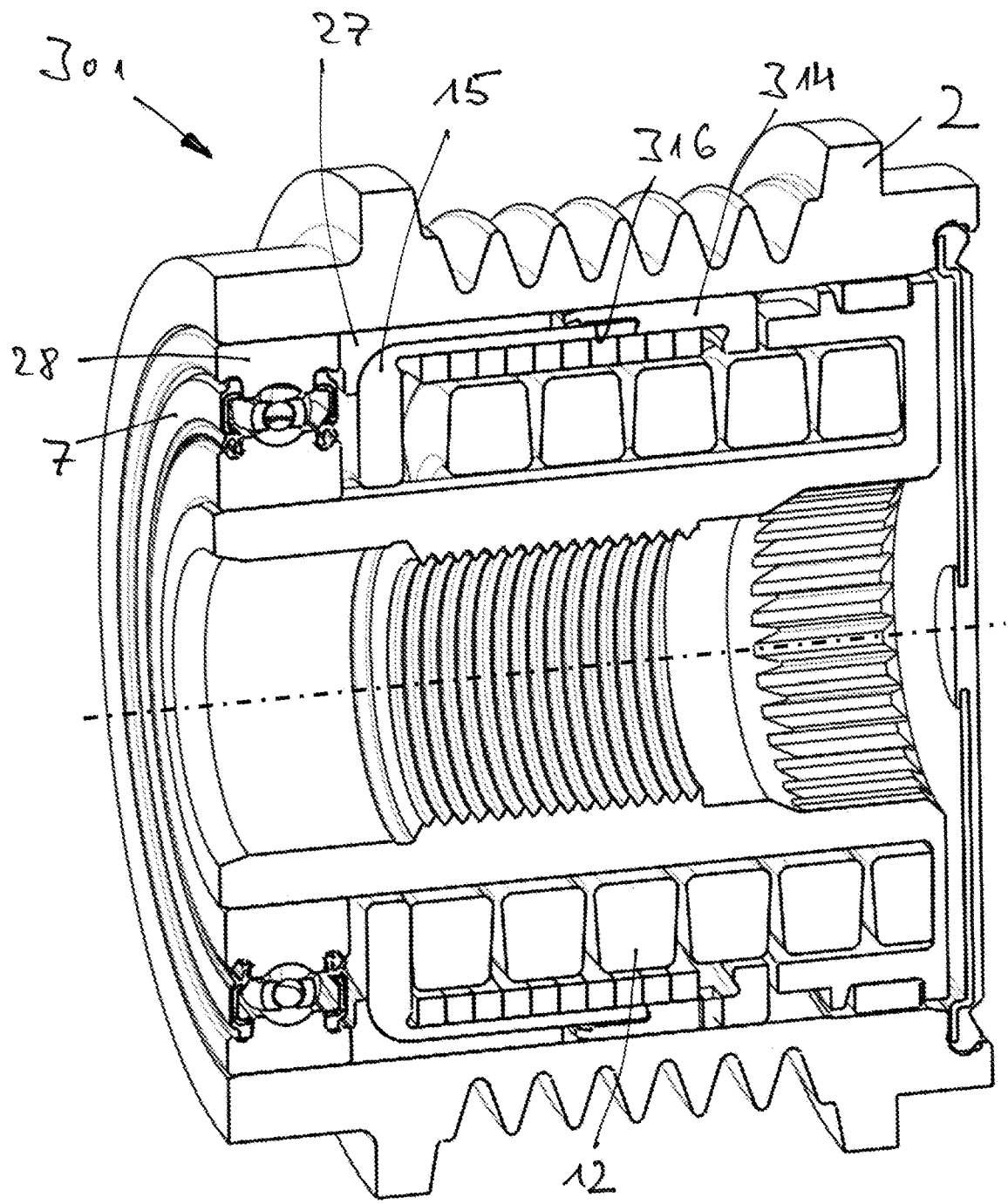
Figure 10:
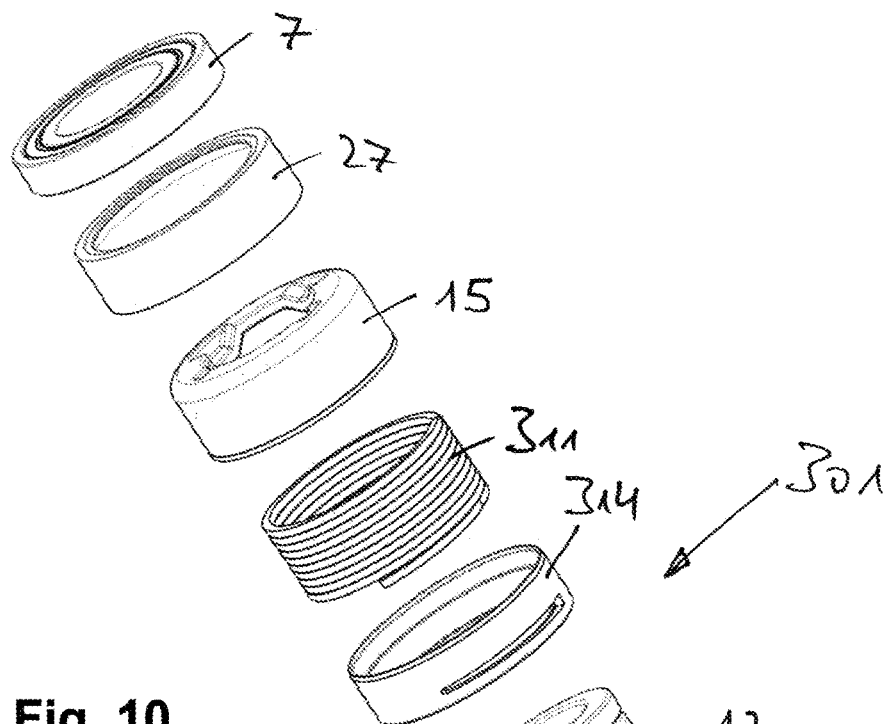
Figure 11:
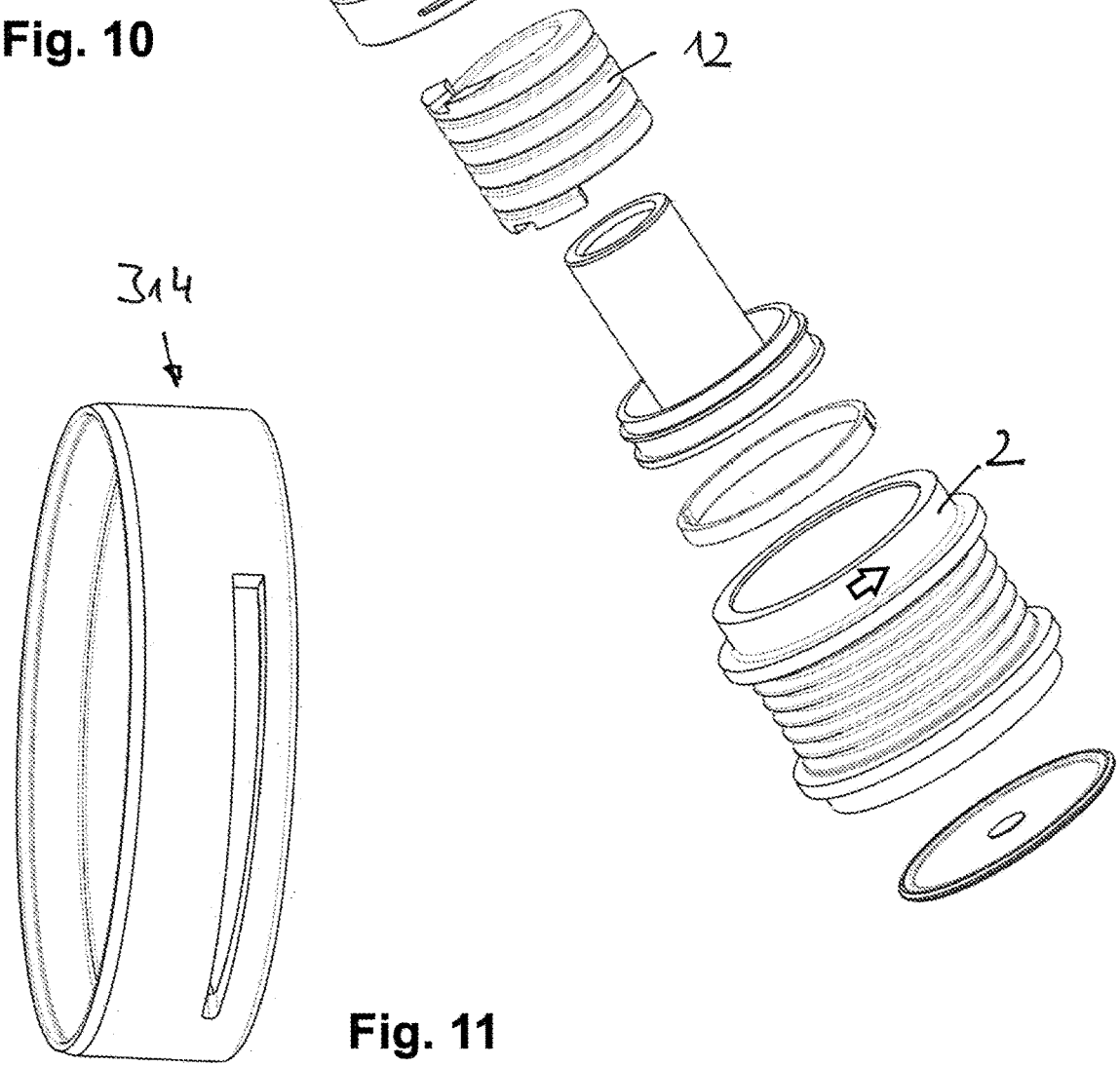

FIGS. 9 and 10 show the third embodiment of a belt pulley decoupler 301 according to the invention in longitudinal section and exploded view, respectively. The belt pulley decoupler 301 has the same engagement of the wrap-around band 311 in the sleeve 314 as the previously explained first embodiment, but differs by the radial support of the second sleeve 15 that can rotate in the belt pulley 2. This is supported both in the region of the expanded inner diameter of the stepped inner lateral surface 316 of the first sleeve 314 and also in the sliding bearing sleeve 27 made from polyamide, which is supported radially in the belt pulley 2, in addition to the first sleeve 314. The first sleeve 314 shown enlarged in FIG. 11 has a short axial construction accordingly. The axial pretensioning force of the decoupler spring 12 is supported in this embodiment by the sliding bearing sleeve 27 on the outer ring 28 of the roller bearing 7. The sliding bearing sleeve 27 is fixed with a slight over-dimension in the belt pulley 2, so that there is no relative rotation between the outer ring 28 locked in rotation in the belt pulley 2 and the sliding bearing sleeve 27 contacting this outer ring.

Figure 12:
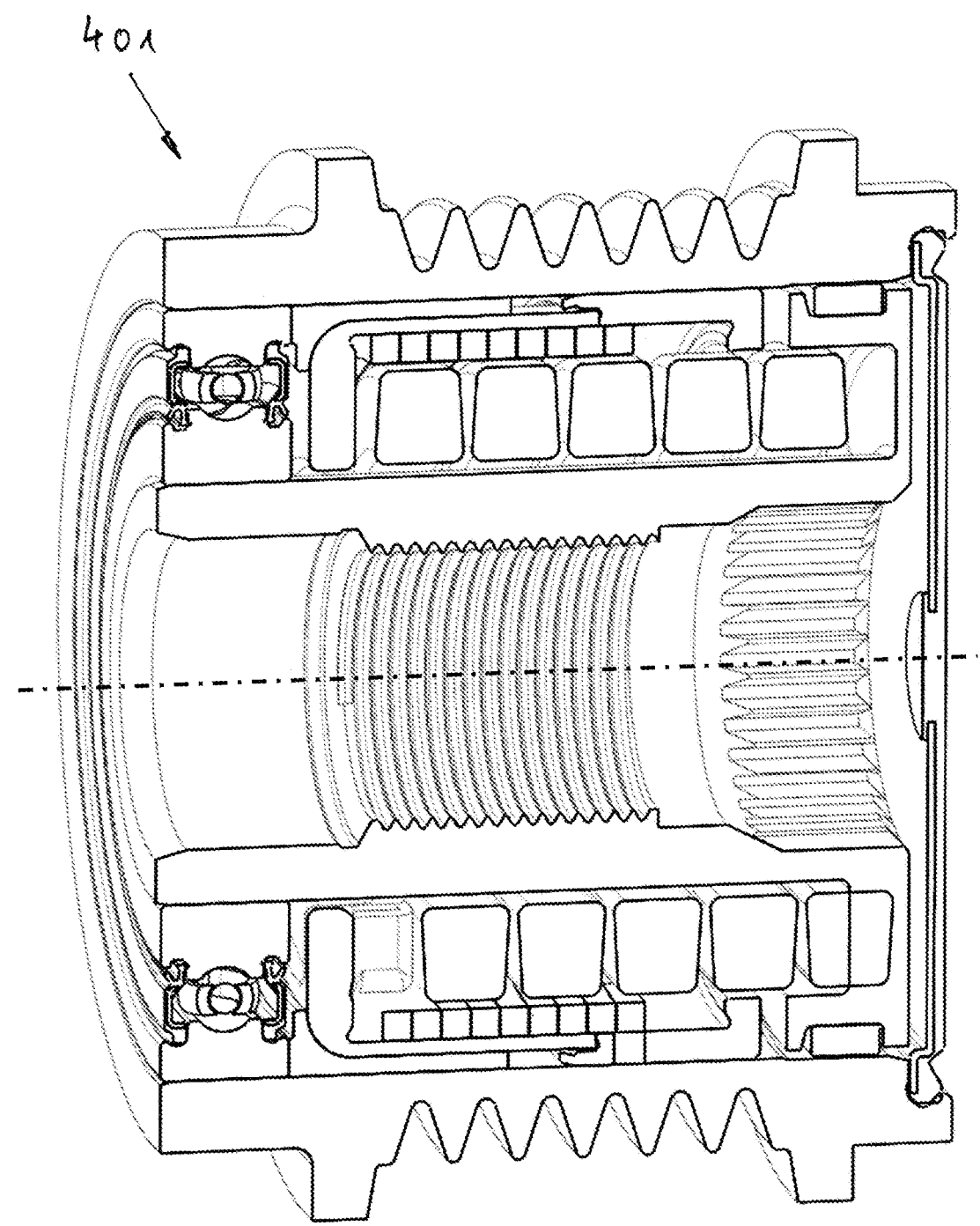
Figure 13:
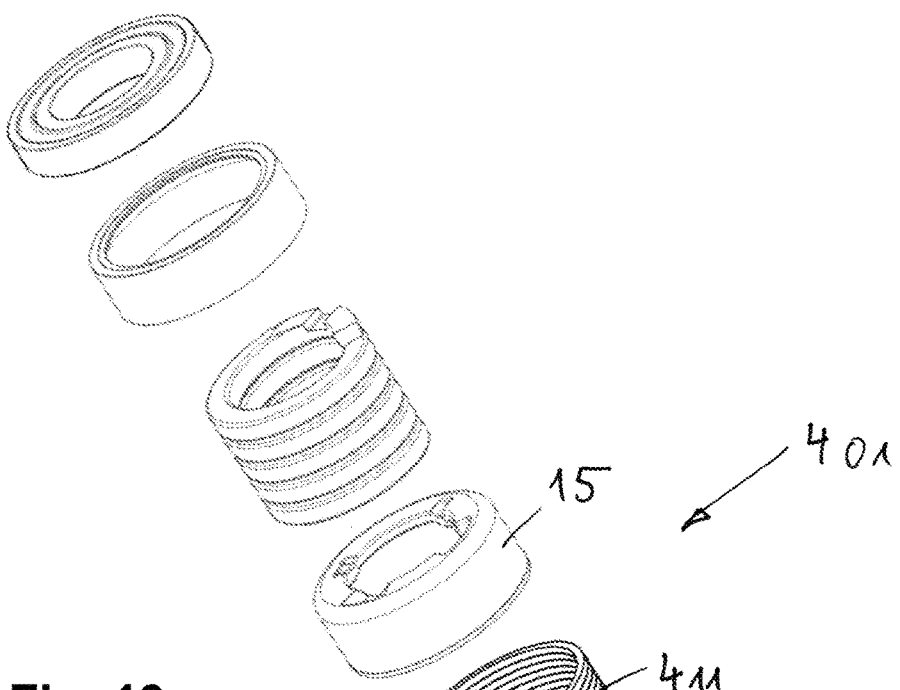
Figure 14:
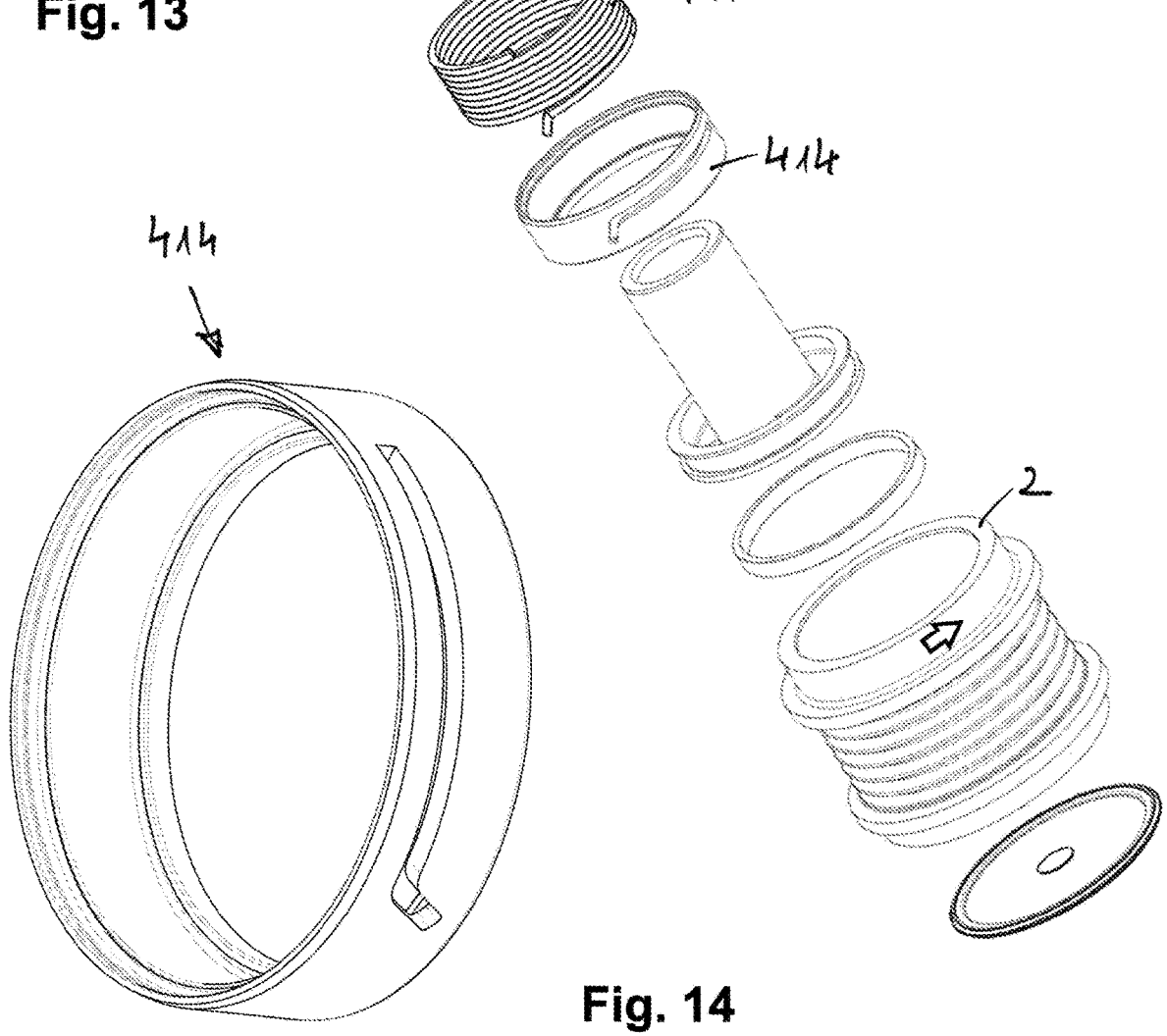

FIGS. 12 and 13 show the fourth embodiment of a belt pulley decoupler 401 according to the invention in longitudinal section and exploded view, respectively. The belt pulley decoupler 401 has the same positive-locking engagement of the wrap-around band 411 in the sleeve 414 shown enlarged in FIG. 14 as the previously explained second embodiment and the same bearing of the sleeve 15 that can rotate in the belt pulley 2 as the previously explained third embodiment.

The invention claimed is:

1. A belt pulley decoupler for transmitting drive torque from a belt of an auxiliary unit belt drive to a shaft of an auxiliary unit, the belt pulley decoupler comprising:
    a belt pulley,
    a hub adapted to be mounted on the shaft,
    a first sleeve rotationally locked in the belt pulley,
    a second sleeve that is rotatable in the belt pulley,
    and a series circuit arranged in a flow of drive torque between the belt pulley and the hub, the series circuit comprising a decoupler spring and a wrap-around band that extends in a direction of a rotational axis of the belt pulley decoupler and is arranged radially between the first and second sleeves and the decoupler spring,
    the wrap-around band includes ends that widen the wrap-around band radially, such that the two sleeves are coupled with each other in a rotationally locked manner while transmitting the drive torque,
    one of the two sleeves has a slot extending circumferentially and the wrap-around band end coupled with said one of the two sleeves is constructed as a leg that is engaged with a positive-locking connection in a rotationally locked manner in the slot in a direction of rotation of the drive torque.

2. The belt pulley decoupler according to claim 1, wherein the leg is engaged in a self-locking manner in the slot against the direction of rotation of the drive torque.

3. The belt pulley decoupler according to claim 1, wherein the leg is engaged with a positive-locking connection in the slot against the direction of rotation of the drive torque.

4. The belt pulley decoupler according to claim 1, wherein the leg is coupled rotationally locked with the first sleeve.

5. The belt pulley decoupler according to claim 1, wherein the second sleeve is supported radially in the first sleeve.

6. The belt pulley decoupler according to claim 1, further comprising a roller bearing that supports the belt pulley on the hub, a sliding bearing sleeve that is supported radially against the belt pulley and axially against the roller bearing, and the second sleeve is supported in the sliding bearing sleeve.

7. The belt pulley decoupler according to claim 6, wherein the roller bearing is a grooved ball bearing and the sliding bearing sleeve contacts an outer ring of the grooved ball bearing.

8. A belt pulley decoupler for transmitting drive torque from a belt of an auxiliary unit belt drive to a shaft of an auxiliary unit, the belt pulley decoupler comprising:
    a belt pulley,
    a hub adapted to be mounted on the shaft,
    a first sleeve rotationally locked in the belt pulley,
    a second sleeve that engages the first sleeve and is rotatable in the belt pulley, and
    a decoupler spring and a wrap-around band arranged between the belt pulley and the hub that carry a flow of drive torque from the belt pulley to the hub, the wrap-around band extends in a direction of a rotational axis of the belt pulley decoupler and is arranged radially between the first and second sleeves and the decoupler spring,
    the wrap-around band includes ends that are adapted to widen the wrap-around band radially during drive torque transmission, such that the first and second sleeves are coupled with each other in a rotationally locked manner,
    one of the two sleeves has a slot extending circumferentially and the wrap-around band end coupled with said one of the two sleeves is constructed as a leg that is engaged with a positive-locking connection in a rotationally locked manner in the slot in a direction of rotation of the drive torque.

9. The belt pulley decoupler according to claim 8, wherein the leg is engaged in a self-locking manner in the slot against the direction of rotation of the drive torque.

10. The belt pulley decoupler according to claim 8, wherein the leg is engaged with a positive-locking connection in the slot against the direction of rotation of the drive torque.

11. The belt pulley decoupler according to claim 8, wherein the second sleeve is radially supported on a stepped inner lateral surface of the first sleeve.

12. The belt pulley decoupler according to claim 11, further comprising a sliding bearing sleeve that is supported radially against the belt pulley, and the second sleeve is supported in the sliding bearing sleeve.

13. The belt pulley decoupler according to claim 8, wherein the leg is coupled rotationally locked with the first sleeve.

14. The belt pulley decoupler according to claim 8, further comprising a roller bearing that supports the belt pulley on the hub.

15. The belt pulley decoupler according to claim 14, further comprising a sliding bearing sleeve that is supported radially against the belt pulley and axially against the roller bearing, and the second sleeve is supported in the sliding bearing sleeve.

16. The belt pulley decoupler according to claim 15, wherein the roller bearing is a grooved ball bearing and the sliding bearing sleeve contacts an outer ring of the grooved ball bearing.

\* \* \* \* \*